(12) United States Patent
Hoerger et al.

(10) Patent No.: US 10,540,298 B2
(45) Date of Patent: Jan. 21, 2020

(54) PROTECTED DATASETS ON TAPE CARTRIDGES

(71) Applicant: HEWLETT PACKARD ENTERPRISE DEVELOPMENT LP, Houston, TX (US)

(72) Inventors: Carl R. Hoerger, Boise, ID (US); Curtis C. Ballard, Fort Collins, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 264 days.

(21) Appl. No.: 15/718,827

(22) Filed: Sep. 28, 2017

(65) Prior Publication Data
US 2019/0095353 A1   Mar. 28, 2019

(51) Int. Cl.
| | |
|---|---|
| G06F 21/00 | (2013.01) |
| G06F 12/14 | (2006.01) |
| G06F 3/06 | (2006.01) |
| H04L 9/32 | (2006.01) |
| G11B 5/008 | (2006.01) |

(52) U.S. Cl.
CPC ........ *G06F 12/1408* (2013.01); *G06F 3/0623* (2013.01); *G06F 3/0653* (2013.01); *G06F 3/0682* (2013.01); *H04L 9/3234* (2013.01); *H04L 9/3268* (2013.01); *H04L 9/3297* (2013.01); *G06F 12/1483* (2013.01); *G06F 2212/1052* (2013.01); *G11B 5/00813* (2013.01)

(58) Field of Classification Search
CPC .. G06F 12/1408; G06F 3/0622; G06F 3/0637; G06F 3/0682; G06F 3/0623; G06F 3/0653; G06F 2212/1052; G06F 12/1483; H04L 9/3242; H04L 9/3226; H04L 9/0891; H04L 9/0872; H04L 9/0866; H04L 9/083; H04L 9/3297; H04L 9/3268; H04L 9/3234; H04L 2209/12; G11B 5/00813
See application file for complete search history.

(56) References Cited

U.S. PATENT DOCUMENTS

| | | | |
|---|---|---|---|
| 5,388,157 | A | 2/1995 | Austin |
| 5,768,372 | A | 6/1998 | Sung et al. |
| 5,915,017 | A | 6/1999 | Sung et al. |
| 6,212,639 | B1 * | 4/2001 | Erickson ............ G06F 12/1408 326/38 |
| 6,263,170 | B1 | 7/2001 | Bortnem |
| 6,356,637 | B1 | 3/2002 | Garnett |
| 6,654,889 | B1 | 11/2003 | Trimberger |

(Continued)

OTHER PUBLICATIONS

Brian McEvoy, "Magnetic Tape Storage May Not Be Retro," Oct. 29, 2017, <https://hackaday.com/2017/10/29/magnetic-tape-storage-may-not-be-retro/>.

(Continued)

*Primary Examiner* — John B King
(74) *Attorney, Agent, or Firm* — Hewlett Packard Enterprise Patent Department

(57) ABSTRACT

Examples described herein include a tape drive with a drive memory, an opening, and a key engine. The drive memory is to store a shared secret. The opening is to receive a tape cartridge that stores a protected dataset and an authorization code. The key engine is to generate a decryption key for the protected dataset based on the authorization code and the shared secret.

14 Claims, 6 Drawing Sheets

(56) References Cited

U.S. PATENT DOCUMENTS

| | | | |
|---|---|---|---|
| 7,203,842 B2 | 4/2007 | Kean | |
| 7,305,366 B2 | 12/2007 | Chase, Jr. et al. | |
| 7,392,225 B2 | 6/2008 | Harada et al. | |
| 7,434,053 B2 | 10/2008 | Parry et al. | |
| 7,735,079 B1 | 6/2010 | Davis et al. | |
| 7,801,869 B2 | 9/2010 | Neill et al. | |
| 7,865,440 B2* | 1/2011 | Jaquette | G06F 21/6218 705/51 |
| 7,873,828 B2 | 1/2011 | Gruba et al. | |
| 8,311,419 B2 | 11/2012 | Jones et al. | |
| 8,577,041 B2 | 11/2013 | Negahdar | |
| 8,631,502 B2 | 1/2014 | Yi et al. | |
| 9,325,505 B2 | 4/2016 | Wang et al. | |
| 2001/0032318 A1 | 10/2001 | Yip et al. | |
| 2001/0037458 A1* | 11/2001 | Kean | G06F 12/1408 713/193 |
| 2002/0004761 A1 | 1/2002 | Sekitani | |
| 2002/0103727 A1 | 8/2002 | Tait et al. | |
| 2002/0120850 A1* | 8/2002 | Walker | G07D 7/00 713/178 |
| 2003/0026021 A1* | 2/2003 | Goodman | G11B 5/00813 360/48 |
| 2005/0021942 A1 | 1/2005 | Diehl et al. | |
| 2006/0095505 A1 | 5/2006 | Zimmer et al. | |
| 2008/0010396 A1* | 1/2008 | Itou | G11B 20/00086 711/100 |
| 2009/0092252 A1* | 4/2009 | Noll | H04L 9/083 380/277 |
| 2009/0097653 A1 | 4/2009 | Dahlerud | |
| 2010/0042834 A1 | 2/2010 | Moret et al. | |
| 2010/0177901 A1* | 7/2010 | Bates | G06F 21/80 380/278 |
| 2012/0173873 A1 | 7/2012 | Bell et al. | |
| 2012/0303974 A1 | 11/2012 | Lin et al. | |
| 2014/0089677 A1 | 3/2014 | Reese et al. | |
| 2015/0052351 A1 | 2/2015 | Nodehi et al. | |
| 2015/0258737 A1 | 9/2015 | Dawson et al. | |
| 2016/0036588 A1* | 2/2016 | Thackston | H04L 9/321 713/168 |
| 2016/0212107 A1 | 7/2016 | Hostetter | |
| 2017/0053050 A1 | 2/2017 | Kothari et al. | |
| 2017/0372042 A1* | 12/2017 | Isles | H04L 9/083 |

OTHER PUBLICATIONS

Peter Groel, "Eliminating the reel motor position sensor in a tape drive," 2002, <http://www.mountainengineering.com/CRT/article1.html>.

Technical Committee ECMA TC17, "Annex D: LTO Cartridge Memory," Data interchange on 12.7 mm 384-Track Magnetic Tape Cartridges—Ultrium-1 Format, Standard ECMA-319, 2001, pp. 95-116.

Technical Committee ECMA TC17, "Data Interchange on 12,7 mm 384-Track Magnetic Tape Cartridges—Ultrium-1 Format,"Standard ECMA-319, 2001.

Wikipedia, "9 track tape," Jun. 23, 2017, <https://en.wikipedia.org/w/index.php?title=9_track_tape&oldid=787115252>.

Wikipedia, "Certificate revocation list," Sep. 22, 2017, <https://en.wikipedia.org/w/index.php?title=Certificate_revocation_list&oldid=801882695>.

Wikipedia, "Floppy disk," Sep. 26, 2017, <https://en.wikipedia.org/w/index.php?title=Floppy_disk&direction=prev&oldid=802639427>.

Wikipedia, "Key derivation function," Sep. 1, 2017, <https://en.wikipedia.org/w/index.php?title=Key_derivation_function&oldid=798383636>.

Wikipedia, "Linear Tape-Open," Sep. 23, 2017, <https://en.wikipedia.org/w/index.php?title=Linear_Tape-Open&oldid=802037362>.

Altera Corporation, "Using the Design Security Features in Altera FPGAs," (Research Paper), Jun. 1, 2016, 39 pages, https://www.altera.com/en_US/pdfs/literature/an/an556.pdf.

Dale Anderson, "Protecting System Configuration Data with CryptoMemory," Amtel Applications Journal, Jan. 31, 2017, <http://www.atmel.com/images/crypto_protect_3_04.pdf>.

Catuogno, L. et al., "Transparent Mobile Storage Protection in Trusted Virtual Domains," (Research Paper), Nov. 1, 2009, 14 pages, http://syssec.rub.de/media/trust/veroeffentlichungen/2010/03/24/mobile_storage_TVDs-CaLoMaSaWi2009.pdf.

Guaike, "Is it possible to encrypt with private key using .net RSACryptoServiceProvider?", available online at <https://stackoverflow.com/questions/1181421/is-it-possible-to-encrypt-with-private-key-using-net-rsacryptoserviceprovider>, Jul. 25, 2009, 6 pages.

* cited by examiner

PROTECTED DATASETS ON TAPE CARTRIDGES

BACKGROUND

Removable media, such as tape cartridges, may each store information about itself in a portion of the media's memory. This information may include details regarding the operation of the media, including the media's maximum capacity, format type, etc. When the removable media is inserted into a drive, the drive may access this information to determine how the media is to be operated.

BRIEF DESCRIPTION OF THE DRAWINGS

The following detailed description references the drawings, wherein.

DETAILED DESCRIPTION

Figure 1:
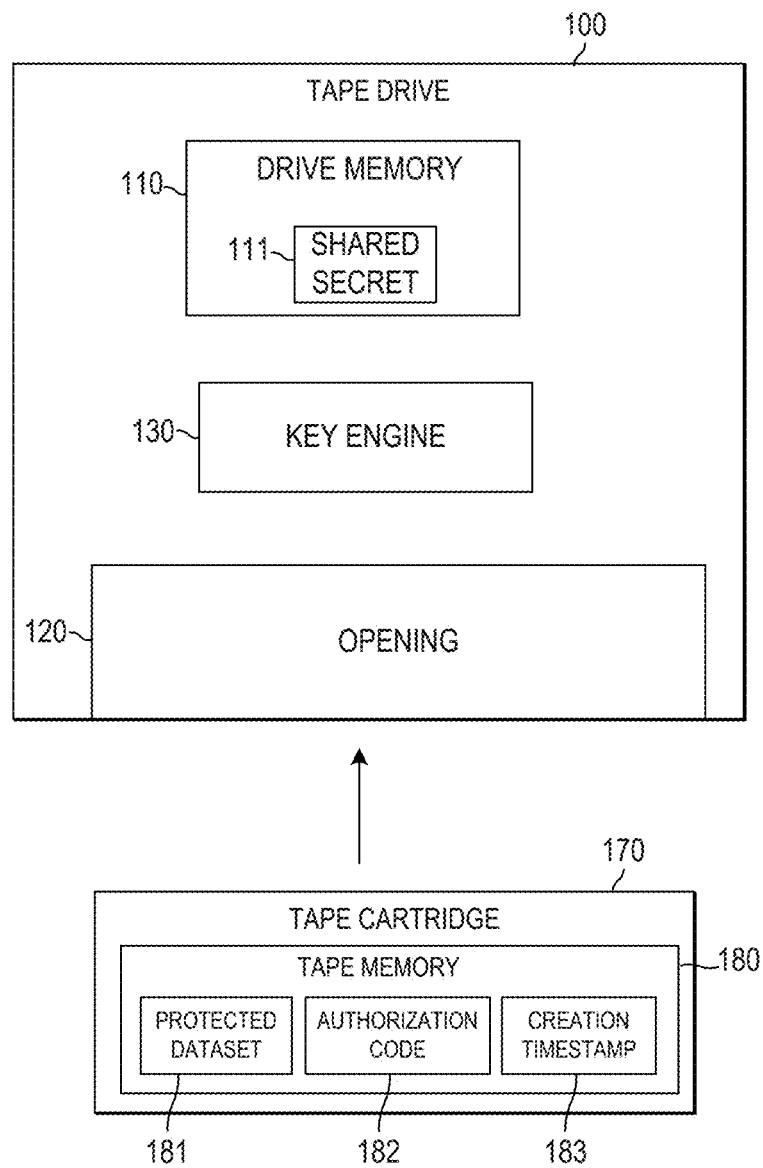
FIG. 1 is a block diagram of a tape drive to generate a decryption key, according to some examples.

A manufacturer of a tape cartridge may sell different versions of the tape cartridge. The different versions may vary in performance capability, formatting, storage capacity, etc. The details for each version of the LTO cartridges may be written in a designated location of the cartridge's memory. While the information written (i.e. dataset) in the designated location may be different from one version of the tape cartridge to the next, the versions may be physically similar to each other. Accordingly, the dataset written at the designated location helps to control the capability and/or operation of the tape cartridge.

For example, linear open tape (LTO) is a format that has many generations. A tape cartridge designed for an older generation (X) may be capable of storing 4 terabytes (TB) while a tape drive designed for a newer generation (X+1) may be capable of reading and writing both 4 TB and 7 TB to a tape cartridge of the older generation (X). Accordingly, the new generation tape drive may require information from the tape cartridge as to whether the specific tape cartridge inserted is a 4 TB or a 7 TB. As another example, manufacturers of linear tape open (LTO) tape cartridges may produce a cartridge that has a 4 terabyte capacity and another version of that same cartridge with a 7 terabyte capacity. The 4 terabyte capacity cartridge and the 7 terabyte capacity cartridge are physically similar in that the 4 terabyte version could physically be capable of storing 7 terabytes. However, it is the written information that limits the 4 terabyte version to a capacity of 4 terabytes.

Because it is the written information (dataset) that controls the capabilities of the tape cartridge, in some examples, it may be desirable to protect the dataset. For example, a manufacturer may be able to create a tape cartridge as one version and protect it from being converted to a different version at another point in time. As another example, a tape cartridge may write patterns that cause errors when attempting to format at a different capacity. Thus, the configuration of the tape cartridge may be protected to prevent errors due to changing formats.

As another example, an end user of the tape cartridge may want to prevent unauthorized modification to the dataset in order to protect user data stored on the tape cartridge. This is because, in some examples, a tape drive may access this dataset to understand how to operate the tape cartridge before accessing the user data stored on the cartridge. Without protection of the dataset, an unauthorized user may modify the dataset to change the way the drive operates the tape, causing the user data on the tape to be inaccessible.

One way that the dataset may be protected is to make the dataset permanent. For example, operating parameters for tape cartridges may be written in fields on the cartridge that are write-protected such that the fields may not be changed once written. However, in some situations, it may be desirable for an authorized user to modify the information stored in the dataset. For example, a tape cartridge manufacturer may implement one format in an earlier version of the tape cartridges and change to another format in a newer version of the tape cartridge. The manufacturer may want to modify the format of the earlier version so that the earlier versions may be compatible with the newer versions. As such, the manufacturer may want to control how and when the dataset is modified.

Examples discussed herein address these challenges by providing a way to protect the dataset from modification by an unauthorized party yet allow modifications by an authorized party. When a tape cartridge is initialized (e.g., by a manufacturer of the cartridge), a protected dataset may be written by a tape drive on to a specific memory location in the tape cartridge. The protected dataset may detail the capabilities and/or operation of the tape cartridge (e.g., format, capacity, performance, etc.). Additionally, the protected dataset may be encrypted using a private key. The tape drive may also write a timestamp that identifies when the protected dataset was written, an authorization code, and an initialization drive ID on to the memory of the tape cartridge. When the tape cartridge is inserted into a tape drive to be appended or read, the tape drive may read the authorization code on the tape cartridge along with a shared secret stored on the tape drive to generate a decryption key. In some examples, an initialization drive ID and/or a timestamp may also be used in addition to the shared secret and the authorization code to generate the decryption key. The decryption key may be used to decrypt the protected dataset. Accordingly, examples discussed herein allow for a dataset to be protected from unauthorized modifications while allowing for authorized modifications. Thus, examples discussed herein allow for the manufacturer to maintain control of the dataset after the tape cartridge is released downstream to an end user.

In some examples, a tape drive comprises a drive memory to store a shared secret, an opening to receive a tape cartridge, and a key engine. The tape cartridge stores a protected dataset, an authorization code, and a creation timestamp. The key engine is to generate a decryption key for the protected dataset based on the authorization code and the shared secret. The authorization code is read from the tape cartridge.

In some examples, an LTO tape drive comprises a drive memory to store a shared secret, an opening to receive an LTO tape cartridge, and a key engine. The LTO tape cartridge comprises tape media and a tape memory separate from the tape media, wherein the separate tape memory stores a protected dataset, an authorization code, a creation timestamp, and a drive initialization ID. The key engine is to generate a decryption key for the protected dataset by inputting the authorization code, the creation timestamp, the shared secret, and the drive initialization ID into a key derivation function. The authorization code, the creation timestamp, and the initialization drive ID are read from the separate tape memory.

In some examples, a method comprises receiving, at a processor of a tape drive, a pre-authorization code, a creation timestamp, and an initialization drive ID from a separate tape memory of an LTO tape cartridge. The method also comprises deriving an authorization code and deriving a decryption key using a key derivation function. The authorization code is derived using a first shared secret and the pre-authorization code. The decryption key is derived using a second shared secret, the authorization code, the creation timestamp, and the initialization drive ID. The method additionally comprises decrypting a protected dataset from the separate tape memory using the decryption key.

Referring now to the figures, FIG. 1 is a block diagram of a tape drive 100 to generate a key for a protected dataset on tape cartridge 170. Tape drive 100 may include a drive memory 110, an opening 120, and a key engine 130. Drive memory 110 may be in the form of non-transitory machine-readable storage medium, such as suitable electronic, magnetic, optical, or other physical storage apparatus to contain or store information for tape drive 100. As used herein, "drive memory" may include a storage drive (e.g., a hard drive), flash memory, any type of storage disc (e.g., a Compact Disc Read Only Memory (CD-ROM), any other type of compact disc, a DVD, etc.), read-only memory (ROM), erasable programmable read-only memory (EPROM), electrically erasable programmable read-only memory (EEPROM), self-encrypting drive (SED) and the like, or a combination thereof that is non-volatile and physically and/or electrically protected from modification by an unauthorized user. This protection from tampering allows drive memory 110 to securely store a shared secret 111. In some examples, drive memory may include a main memory, such as a Random Access Memory, where data or software may reside during runtime. The main memory may be protected using security measures meeting standards such as FIPS 140-2.

As used herein, a "shared secret" includes data that acts as an additional input into a function. In some examples, the shared secret is known to authorized entities, such as a manufacturer of cartridge tape 170 and/or tape drive 100 and kept hidden from un-authorized entities. Shared secret 111 may be, but is not limited to, a password, a passphrase, a string of alphanumeric characters, an array of bytes, etc. In some examples, the shared secret 111 may be random or arbitrary. In some examples, shared secret 111 may be statically defined during manufacture of the tape drive 100 and stored on drive memory 110 by a manufacturer of tape drive 100. In some examples, shared secret 111 may be changed periodically by the manufacturer of tape drive 100. For example, shared secret 111 may be updated during an update to the tape drive's 100 firmware. In other examples, shared secret 111 is statically defined once and cannot be changed.

Opening 120 is a slot in an outer housing of tape drive 100 that allows for tape drive 100 to receive a tape cartridge 170. In some examples, opening 120 may be sized and physically arranged to receive certain types of tape cartridges 170, such as linear tape open (LTO) tape cartridges.

Tape cartridge 170 may include a physical tape media that stores user data (e.g. backup data, etc.) in a magnetic form. In some examples, a tape head may reside inside of opening 120. Additionally, reel motors may reside on either side of the tape head. The reel motors may move the tape media over the tape head, controlling the location of the tape media, and the tape head may transform the magnetic field on the tape media into an electrical current (in the process of reading user data from the tape cartridge) or transform electrical current into a magnetic field (in the process of writing user data to the tape cartridge).

Tape cartridge 170 may also include a tape memory 180. Tape memory, as used herein, may include any suitable nonvolatile electronic, magnetic, optical, or other physical storage apparatus to store information pertaining to tape cartridge 170. This may include magnetic tape, flash memory, other types of memory using integrated circuits (e.g., RFID), etc. In some examples, tape memory 180 may be part of the physical tape media that stores user data and may be at a pre-defined specific location on the tape media. In these examples, tape drive 100 may be designed to start reading the tape media at the pre-defined specific location before accessing the other locations of the tape media (e.g., firmware on the tape drive may instruct a processor of tape drive to cause the tape media to move across the tape head and position the tape media to the specific pre-defined location).

In other examples, tape memory 180 may be stored in a separate memory from the tape media. As used herein, a "separate" memory is a physical medium that is different from the tape media that stores user data. In these examples, this separate memory may be a radio frequency identification (RFID) chip. An RFID chip may include an integrated circuit and an antenna which transmits data on radio waves. In these examples, tape drive 100 may include an RFID reader that reads the RFID chip. The RFID reader receives the radio wave from the RFID chip and converts the waves into an electrical form.

Referring back to FIG. 1, tape memory 180 may be written during initialization of tape cartridge 170 and may store a protected dataset 181, an authorization code 182, and a creation timestamp 183. As used herein, a "protected dataset" includes a dataset written (i.e. stored) on tape memory 180 that cannot be understood by the drive in its original form (i.e. the form on which it is stored on the tape memory). In some examples, the protected dataset may be written on the cartridge using a private key that is a member of a public key/private key pair. In other examples, the protected dataset may be written using a symmetrical key that is used for both encryption and decryption. Accordingly, in either example, the dataset is protected via encryption and the drive does not understand the dataset without first decrypting the dataset. The protected dataset may store cartridge operation and/or capability information for tape cartridge 170, including, but not limited to cartridge capacity information (e.g. usable tape media length), cartridge format (e.g. single format or multi-format), number of allowable partitions on the tape cartridge, the read/write capabilities of the tape (e.g., ability limited to write once, read many (WORM)), etc. Accordingly, this protected dataset may allow a manufacturer of tape cartridge 170 to control downstream operations on the tape cartridge 170.

Authorization code 182 may include an alphanumeric string that, when authentic and valid, helps to decrypt protected dataset 181. In some examples, authorization code 182 is generated "live" when it is written on to tape memory 180 using complex, algorithmically defined rules derived from an encryption key generation mechanism known in the industry such as HMAC-based Extract-and-Expand Key Derivation Function (HKDF), password based key derivation functions (PBKDF), etc. that result in unique and non-repetitive codes (i.e. mathematically unlikely to be generated again). In other examples, authorization code 182 is chosen from a pre-generated list of static authorization codes. In example using a pre-generated static list, each authorization code on the static list of authorization codes is also generated using complex, algorithmically defined rules.

Creation timestamp 183 is data on tape memory 180 that keeps track of the time and date when protected dataset 181 was written to tape memory 180.

As discussed above, manufacturers may use protected dataset 181 to control down-stream operations of tape cartridge 170. Thus, in some examples, protected dataset 181, authorization code 182, and creation timestamp 183 are written to tape memory 180 by the manufacturer of tape cartridge 170 before tape cartridge 170 is released to the user. In some examples, a manufacturer may have a tape drive at a physical location that is used to initialize a newly manufactured tape cartridge (i.e. an initialization drive). At the initialization drive, the manufacturer decides how a specific tape cartridge is to be operated after it is sold to a user (e.g., that a specific tape cartridge will have a certain format and certain capacity, etc.). This information is encrypted using a private key known to the manufacturer and the encrypted data is written to tape memory 180 as protected dataset 181.

In examples where the authorization code is generated "live", the initialization drive generates authorization code 181 from a specific algorithm and writes the code to tape memory 180. In examples where the authorization code is chosen from a static authorization code list, the initialization drive may already have an authorization code list saved in its memory. The initialization drive may chose a code from the list and write that chosen authorization code to the memory.

Additionally, the initialization drive writes creation timestamp 183 to the tape memory 180 to indicate when protected dataset 181 was written. As will be discussed below, creation timestamp 183 and authorization code 181 may be used to access the information encrypted in protected dataset 181.

As discussed above, tape drive 100 includes a key engine 130. Engine 130 and any other engines of tape drive 100 may be any combination of hardware (e.g., a processor such as an integrated circuit or other circuitry) and software (e.g., machine or processor-executable instructions, commands, or code such as firmware, programming, or object code) to implement the functionalities of the respective engine. Such combinations of hardware and programming may be implemented in a number of different ways. A combination of hardware and software can include hardware (i.e., a hardware element with no software elements), software hosted at hardware (e.g., software that is stored at a memory and executed or interpreted at a processor), or hardware and software hosted at hardware. Additionally, as used herein, the singular forms "a," "an," and "the" include plural referents unless the context clearly dictates otherwise. Thus, for example, the term "engine" is intended to mean at least one engine or a combination of engines.

Each engine of tape drive 100 may include at least one machine-readable storage mediums (for example, more than one) and at least one processor (for example, more than one). Additionally, the engines of tape drive 100 may share at least one machine-readable storage medium and at least one processor.

As used herein, "machine-readable storage medium" may include a flash memory, Random Access Memory (RAM), any type of storage disc (e.g., a Compact Disc Read Only Memory (CD-ROM), any other type of compact disc, a DVD, etc.) and the like, or a combination thereof. In some examples, a storage medium may correspond to memory including a main memory, such as a Random Access Memory, where software may reside during runtime, and/or a secondary memory. The secondary memory can, for example, include a nonvolatile memory where a copy of software or other data is stored. Drive memory 110 may be a similar type of memory as the type of memory used for engine 130.

For example, software that provides the functionality of engine 130 can be stored on a memory of tape drive to be executed by a processor of the tape drive 100. In some examples, each engine of tape drive 100 may include hardware in the form of a microprocessor on a single integrated circuit, related firmware, or other software for allowing microprocessor to operatively communicate with other hardware of tape drive 100.

As used herein, a processor may, for example, be in the form of a central processing unit (CPU), a semiconductor-based microprocessor, a digital signal processor (DSP) such as a digital image processing unit, other hardware devices or processing elements suitable to retrieve and execute instructions stored in a storage medium, or suitable combinations thereof. The processor can, for example, include single or multiple cores on a chip, multiple cores across multiple chips, multiple cores across multiple devices, or suitable combinations thereof. The processor can be functional to fetch, decode, and execute instructions that implement engine 130, and any other engines, as described herein.

Key engine 130 is an engine of tape drive 100 that includes a combination of hardware and software that allows tape drive 100 to generate a decryption key for protected dataset 181. The decryption key may be based on shared secret 111 stored on drive memory 11, and on authorization code 181 and creation timestamp 183 stored on tape memory 180. In some examples, key engine 130 may include a key derivation function. Key derivation function may be a mathematical algorithm with two inputs that outputs a decryption key. The inputs are for shared secret 111 and authorization code 182. Based on the authorization code and shared secret, the decryption key may be used to de-code the protected dataset 181. Thus, in some examples where tape memory 180 is part of the tape media, key engine 130 may send a signal to the reel motors to move the tape media to a predetermined location on the tape media where the tape memory 180 is located. The tape head may translate the magnetic information into electrical format and key engine 130 may receive this electrical format. Key engine 130 may then input authorization code 182 along with the shared secret into the key derivation function. In some examples where tape memory 180 is separate from the tape media, key engine 130 may receive this information from a reader that may access the tape memory 180. For example, in situations where tape memory 180 is implemented in an RFID chip, tape drive 100 may have an RFID reader. RFID reader receives the radio signals from the chip and converts them into electrical signal. Key engine 130 may receive the electrical signals (authorization code, creation timestamp) from the RFID reader and process the signals along with shared secret 111 to generate a decryption key.

In some examples, the decryption key that is outputted is the public member of the private key/public key pair while the encryption key used to initially write the protected dataset is the private member of the pair. In other examples, the decryption key that is outputted is a symmetrical key that is the same key that was used to encrypt the protected dataset.

As discussed above, authorization code 182 is generated using algorithmically defined rules and thus follows the mathematic rules of that algorithm. As such, in some examples, key engine 130 may determine an authenticity of authorization code 182. In some examples where the authorization code is generated "live", the authenticity may be determined by checking if the authorization code 182 meets all of the defined rules of the algorithm. In some examples where the authorization code is picked from a static list of codes, the authenticity may also be determined by checking if the code meets all of the defined rules of the algorithm.

An authorization code that meets all of the defined rules of the algorithm is determined to be an authentic authorization code. An authorization code that fails one of the defined rules of the algorithm is determined to be an un-authentic authorization code. Based on a determination that the authorization code is authentic, key engine 130 may input the authorization code along with shared secret 111 into the key derivation function. However, based on a determination that the authorization code is un-authentic, key engine 130 may return an error. When an error is returned, the tape drive 100 may not access protected dataset 181, and in return, may be unable to access (e.g., read and/or write to the tape media) the tape media of tape cartridge 170 as tape drive 100 is missing operation information for tape cartridge 170.

Accordingly, the operation of tape cartridge 170 may be controlled down-stream by a manufacturer of tape cartridge 170 and/or a manufacturer of a tape drive. Because of the encryption, a user is unable to meaningfully change the information in the protected dataset. Additionally, key engine 130 uses two variables stored in different locations (an authorization code on the cartridge and a shared secret on the drive) as inputs into a key derivation function. This further protects the access of protected dataset as all inputs need to be accurate in order to arrive at the correct result. For example, a tampering of one variable results in an incorrect decryption key. Accordingly, this may allow for a more secure method of determining decryption keys when compared to situations that rely on the storage of a decryption key at a different, secure location (e.g., a key server or a location on the tape cartridge itself) because, in examples discussed herein, the key is generated. Accordingly, the secrecy of the key is not compromised when the security of the different, secure location is compromised.

Figure 2:
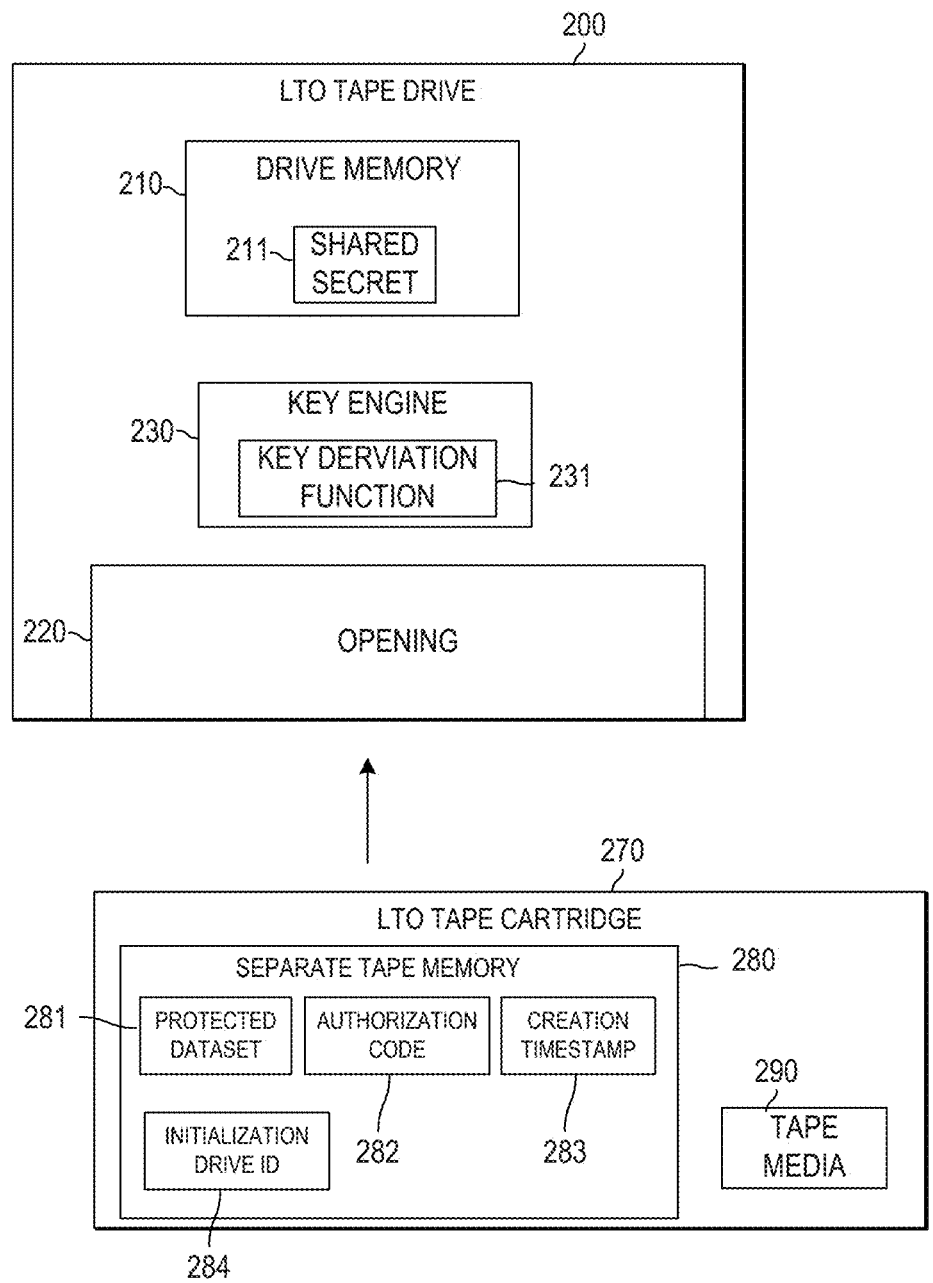
FIG. 2 is a block diagram of an LTO tape drive to generate a decryption key for an LTO tape cartridge, according to some examples.
Figure 3:
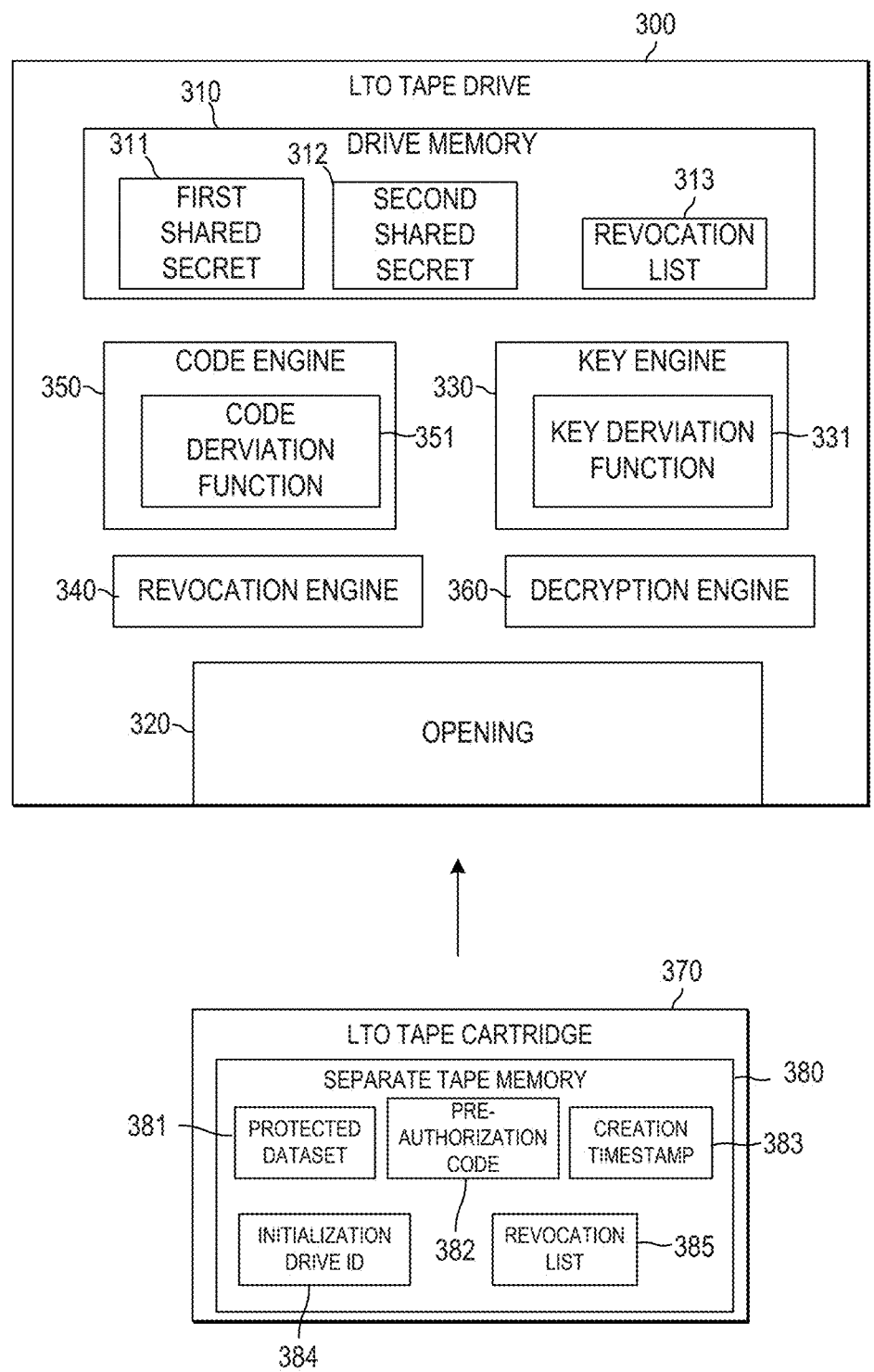
FIG. 3 is a block diagram of an LTO tape drive to generate an authorization code and a decryption key for an LTO tape cartridge, according to some examples.

Tape drive 100 of FIG. 1, which is described in terms of engines containing hardware and software, may include one or more structural or functional aspects of LTO tape drive 200 of FIG. 2 or LTO tape drive 300 of FIG. 3. Additionally, while the example of FIG. 1 uses only the authorization code as an input to generate the decryption key, additional inputs may be used. For example, creation timestamp 183 may be used as an additional input.

FIG. 2 is a block diagram of an LTO tape drive 200 to generate a decryption key for an LTO tape cartridge 270. LTO is a specification that defines multiple tape formats and has several generations. Each generation may use a different format. Accordingly, for a given generation of an LTO tape, data is written to and read from the LTO cartridge using a particular format according to the definition of the format for the given generation.

LTO tape drive 200 includes a drive memory 210, an opening 220, and a key engine 230. LTO tape drive 200 is configured to read and/or write to an LTO tape cartridge. Thus, LTO tape drive 200 may include physical mechanisms that follow the LTO formats, as set by the LTO program. This may include the location and number of tape heads, etc. Thus, opening 220 is similar to opening 120, except that opening 220 may include physical mechanisms that are aligned with the LTO formats. Accordingly, opening 220 is sized to receive an LTO tape cartridge.

Drive memory 210 is similar to drive memory 110 and thus the discussion above for drive memory 110 is applicable here. Drive memory 210 stores a shared secret 211. Shared secret 211 is similar to shared secret 111 and thus the discussion above for shared secret 111 is applicable here. Key engine 230 and is similar to key engine 130 as discussed above, except that key engine 230 may receive an additional input of an initiation drive ID into its key derivation function 231, as discussed below.

LTO tape cartridge 270 may be inserted into opening 220 of LTO tape drive 200. LTO tape cartridge 270 has tape media 290, and a separate tape memory 280. Separate memory 280 is similar to tape memory 180, except that separate memory 280 is on a different physical medium than tape media 290 that stores user data on LTO tape cartridge 270. In some examples, separate tape memory 280 may be implemented using an RFID chip. As discussed above, in examples where separate tape memory 280 is implemented using an RFID chip, LTO tape drive 200 may include an RFID reader to read the radio waves transmitted by the RFID chip.

Separate tape memory 280 stores a protected dataset 281, an authorization code 282, a creation timestamp 283, and an initialization drive ID 284. Protected dataset 281 is similar to protected dataset 181, authorization code 282 is similar to authorization code 182, and creation timestamp 283 is similar to creation timestamp 183. Accordingly, the discussions above in relation to protected dataset 181, authorization code 182, and creation timestamp 183 are applicable here.

Initialization drive ID 284 is the additional component stored on separate tape memory 280 that is not present on tape memory 180. Similar to the protected dataset, authorization code, and creation timestamp, initialization drive ID may also be written to separate tape memory 280 when LTO tape cartridge 270 is initialized.

As discussed above, LTO tape cartridge 270 may be initially configured and formatted by an initialization drive. At the initialization drive, the initialization drive may write the protected dataset 281, the authorization code 282, and the creation timestamp 283 to the separate tape memory 280. There may be a number of initialization drives located at different locations. A specific initialization drive may be associated to a unique identifier (i.e. the initialization drive ID) that identifies the specific initialization drive in the manufacturer's system. When the initialization drive writes the protected dataset 281 to the separate tape memory 280, the initialization drive may also write the initialization drive ID to the separate tape memory 280.

As discussed above, the initialization drive ID may be an additional input to key derivation function 231 of key engine 230. When LTO tape cartridge 270 is inserted into LTO tape drive 200, physical mechanisms of LTO tape drive 200 may read the separate tape memory 280 and convert the signals into electrical signals. Key engine 130 may receive the electrical signals (authorization code, creation timestamp, initialization drive ID) from the reader and process the signals along with shared secret 211 to generate a decryption key. Specifically, key engine 230 may use key derivation function 231 and four inputs of authorization code 282, creation timestamp 283, initialization drive ID 284, and shared secret 211.

Tape drive 200 of FIG. 2 may include one or more structural or functional aspects of tape drive 100 of FIG. 1 or LTO tape drive 300 of FIG. 3. For example, tape drive 200 may include decryption engine 360, revocation engine 340, and/or code engine 350 as discussed in FIG. 3. Additionally, while the example of FIG. 2 uses the authorization code, creation timestamp, and initialization drive ID as inputs to generate the decryption key, additional and/or less inputs may be used. For example, creation timestamp 283 and/or initialization drive ID 284 may not be used as inputs. Thus, in some examples, three inputs may be inputted into key derivation function 231 (e.g., authorization code, shared secret, and creation timestamp; or authorization code, shared secret, and drive initialization ID).

FIG. 3 is a block diagram of an LTO tape drive 300 to generate an authorization code and a decryption key. LTO tape drive 300 includes a drive memory 310, an opening 320, a key engine 330, a revocation engine 340, a code engine 350, and a decryption engine 360.

Drive memory 310 is similar to drive memory 210 in FIG. 2 and drive memory 110 in FIG. 1 except that drive memory 310 stores a second shared secret 312 and a revocation list 313 in addition to a first shared secret 311. First shared secret 311 is similar to shared secret 111 and shared secret 211. Shared secret 312 is a shared secret that is different from shared secret 311. Thus, shared secret 311 may be characterized as a "first" shared secret and shared secret 312 may be characterized as a "second" shared secret. As described below, first shared secret 311 may be used by code engine 350 to generate an authorization code and second shared secret 312 may be used by key engine 330 to generate a decryption key. However, the use of first and second is to identify the secrets as being separate and different from each other and do not correlate to the manner in which they are used in or written to LTO tape drive 300.

Revocation list 313 may include at least one entry of an authorization code that has been revoked. Revocation list 313 may also include at least one entry of a pre-authorization code that may be used to generate a revoked authorization code (e.g., using a shared secret as discussed above). Each entry on revocation list 313 may be associated with a revocation timestamp that identifies when the specific entry was added to the revocation list 313. The authorization codes that are on and/or represented by pre-authorization codes on revocation list are authentic (i.e. follow all of the rules that is used by key engine 330 to check authenticity of a code, as described above), but due to a reason, their authenticity has been revoked. For example, an authorization code may be revoked because it no longer provides sufficient security protection. The security of a code may be compromised for example, when a bad actor discovers a specific authorization code, or when a code is known to be used in gray market products, etc. The authorization code may then be considered invalid and be placed on revocation list 313. In some examples, revocation list 313 is a list that is written to drive memory 310 during initialization by the tape drive manufacturer. In some examples, revocation list 313 may be updated periodically, for example, when firmware of LTO tape drive 300 is updated. Additionally, in some examples, LTO tape drive may access revocation list 313 to update it outside of a firmware update cycle. For example, revocation list 313 may be modified based on a determination that an inserted LTO tape cartridge includes a more recent version of a revocation list stored on drive memory 310. This is discussed below in relation to revocation engine 340.

Code engine 350 is an engine of LTO tape drive 300 that includes a combination of hardware and software that allows LTO tape drive 300 to derive an authorization code from a pre-authorization code that is stored on separate tape memory 380 of LTO tape cartridge 370. Code engine 350 may include a code derivation function 351. Code derivation function 351 may be based on algorithmically defined rules derived from encryption key generation mechanism which may be an encryption key generation mechanism known in the industry such as HMAC-based Extract-and-Expand Key Derivation Function (HKDF), password based key derivation functions (PBKDF), etc. In the example of FIG. 3, separate tape memory 380 may store a pre-authorization code 382 instead of an authorization code, such as in examples of FIG. 1 and FIG. 2. In some examples, pre-authorization code 382 may be a hashed value of an authentic authorization code. Pre-authorization code 382 may be written on separate tape memory 380 of LTO tape cartridge 370 by the initialization drive that writes protected dataset 381 at the same time protected dataset 381 is written. Accordingly, when LTO tape cartridge 370 is inserted into LTO tape drive 300, LTO tape cartridge 370 may already have pre-authorization code stored on separate tape memory 380.

Code engine 350 may input pre-authorization code 382 into code derivation function 351 along with first shared secret 311 to derive an authorization code that should be authentic. The storage of pre-authorization code 382 on LTO tape cartridge 370 instead of an authentic authorization code allows for a higher level of protection as compared to directly storing the authorization code on LTO tape cartridge. For example, the storage of an authentic authorization code on LTO tape cartridge may allow a bad actor to read an authorization code from one LTO tape cartridge and use that authorization code to access another LTO tape cartridge. After an authorization code is derived by code engine 350 (from pre-authorization code 382 and first shared secret 311), key engine 330 may determine whether the derived authorization code is authentic, as discussed above in relation to key engine 230.

Revocation engine 340 is an engine of LTO tape drive 300 that includes a combination of hardware and software that allows LTO tape drive 300 to determine a validity of an authentic authorization code. After key engine 330 determines whether a derived authorization code is authentic, revocation engine 340 may determine whether the authentic authorization code is valid. As used herein, a "valid" authorization code is an authentic code that was not revoked at the time the revocation list was generated. Thus, an "invalid" authorization code is an authentic code that was revoked at the time the revocation list was generated. Revocation engine 340 may determine a validity of an authentic authorization code by comparing the code that is derived by code engine 350 to codes listed on either revocation list 313 or revocation list 385.

To determine which revocation list to use, revocation engine 340 may compare revocation list 313 to revocation list 385. In some examples, revocation list 313 may have an associated timestamp which identifies when revocation list 313 was created and revocation list 385 may also have an associated timestamp which identifies when revocation list 385 was created. These associated timestamps may be characterized as list timestamps. Based on a determination that revocation list 313 is newer (i.e. created at a point in time that occurred later in time) than revocation list 385, revocation engine 340 uses revocation list 313 to determine a validity of the derived authorization code. Based on a determination that revocation list 385 is newer than revocation list 313, revocation engine 340 uses revocation list 385 to determine a validity of the derived authorization code. In some examples, revocation list 385 is written on separate tape memory 380 of LTO tape cartridge 370 by the initialization drive that writes protected dataset 381 at the same time protected dataset 381 is written. In other examples, revocation list 385 may be written at a different time than protected dataset 381 and/or by a different tape drive. For example, revocation list 385 may be written by the tape cartridge manufacturer at the time the cartridge is built. Accordingly, in the example of FIG. 3, when LTO tape cartridge 370 is inserted into LTO tape drive 300, LTO tape cartridge 370 already has revocation list 385 stored on separate tape memory 380. However, in other examples, LTO tape cartridge 370 does not have revocation list 385 stored on separate tape memory 380 when it is inserted in LTO tape drive 300. In these examples, revocation engine 340 may use revocation list 313 to determine a validity of derived authorization code. Accordingly, revocation engine 340 may check to see if LTO tape cartridge 370 has a revocation list stored on it by looking at a specific location on separate tape memory 380.

Based on a determination that the authorization code does not appear on the most recent revocation list, revocation engine 340 may signal to key engine 330 that the derived authorization code is valid and key engine 330 may use the derived authorization code (along with second shared secret 312, creation timestamp 383, and initialization drive ID 384) to input into key derivation function 331 to generate a decryption key.

However, based on a determination that the derived authorization code appears on the most recent revocation list, revocation engine 340 may further compare timestamps to determine whether the derived authorization code is valid. It may do so by comparing a timestamp associated with the entry on the revocation list (i.e. the revocation timestamp associated with specific entry) and the creation timestamp 383. Based on a determination that creation timestamp 383 is more recent than the revocation timestamp, revocation engine 340 determines that the derived authorization code is invalid. This is because protected dataset 381 and thus pre-authorization code 382 was written after the derived authorization code was designated as invalid and thus the pre-authorization code was already invalid at the time the code was written. Accordingly, revocation engine 340 may signal to key engine 330 that the derived authorization code is invalid and an error may be returned to the user.

Based on a determination that the revocation timestamp (associated with the entry) is more recent than creation timestamp 383, revocation engine 340 determines that the derived authorization code is valid. This is because the derived authorization code was valid while it was written to the LTO tape cartridge and the problems causing the authorization code to be designated as invalid may not affect the LTO tape cartridge (as it was written before). Revocation engine 340 may signal to key engine 330 that the derived authorization code is valid. Accordingly, key engine 330 may use the derived authorization code (along with second shared secret 312, creation timestamp 383, and initialization drive ID 384) to input into key derivation function 331 to generate a decryption key.

In some examples, revocation engine 340 may determine whether a revocation list has expired in light of another available revocation list (i.e. determining an expiration of a revocation list) and direct LTO tape drive to update the expired revocation list accordingly. Revocation engine 340 may do this by comparing the timestamps associated with different revocation lists (i.e. the list timestamps). Thus, revocation engine 340 may determine the expiration of revocation list 313 in light of revocation list 385 by looking at the timestamps associated with both lists. Based on a determination that revocation list 385 is more recent than revocation list 313 (i.e. that revocation list 313 is expired), revocation engine 340 may direct LTO tape drive 300 to modify revocation list 313 with the entries on revocation list 385. Based on a determination that revocation list 313 is more recent than revocation list 385 (i.e. that revocation list 385 is expired), revocation engine 340 may direct LTO tape drive 300 to modify revocation list 385 with the entries on revocation list 313. As used herein, "modify" includes copying all or some entries from one list to the other while keeping all or some of the entries of the old list. "Modify" also includes copying all or some entries from one list to the other while deleting some or all of entries in the old list. Thus, modifying may be changing one list based on the other list, replacing one list with the other list, overwriting one list with the other list, etc. Accordingly, revocation engine 340 may include hardware to communicate with the physical mechanisms that read/write to separate tape memory 380 (e.g., an RFID chip reader/writer, etc.) such that it may send a signal to direct the modification.

Decryption engine 360 is an engine of LTO tape drive that includes a combination of hardware and software that allows LTO tape drive 300 to decrypt a protected dataset 381 using a decryption key generated by key engine 330. Thus, in some examples, decryption engine 360 may receive both the decrypted protected dataset 381 from the physical mechanisms that read the separate tape memory 380 and the decryption key from key engine 330, and decrypt the protected dataset 381 into usable information with the decryption key.

LTO tape drive 300 of FIG. 3 may include may include one or more structural or functional aspects of tape drive 100 of FIG. 1 or LTO tape drive 200 of FIG. 2. Additionally, each engine described in relation to LTO tape drive 300 may be implemented without the entirety of all engines described in LTO tape drive 300. For example, revocation engine 340 may be implemented without code engine 350. In these examples, revocation engine 340 may check a validity of an authorization code that is stored on LTO tape cartridge 370.

Figure 4:
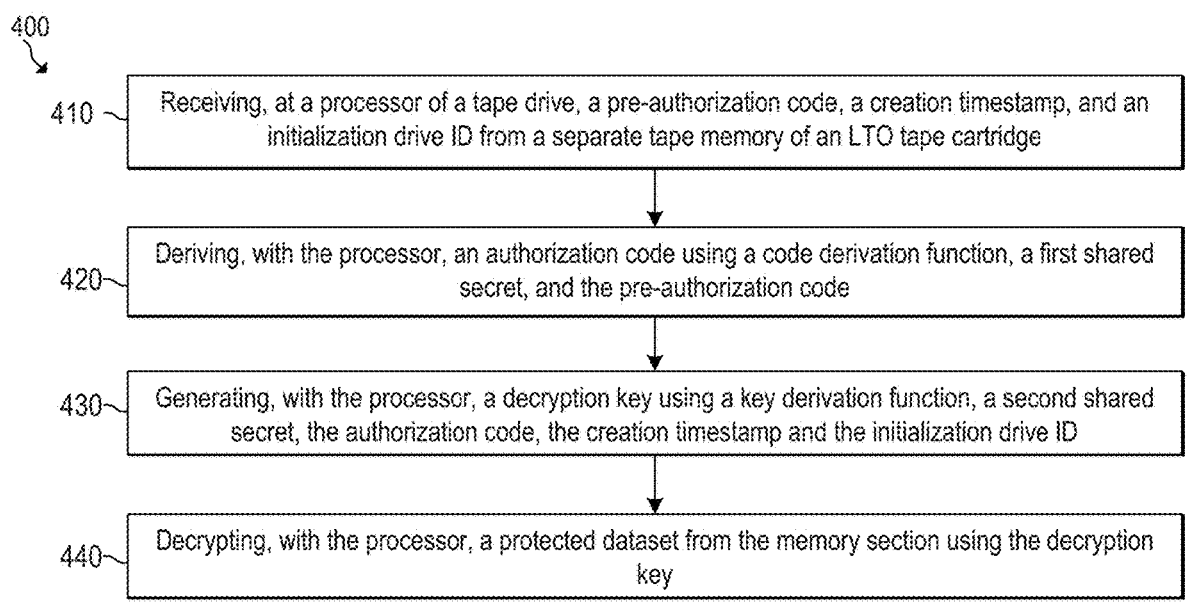
FIG. 4 is a flowchart of a method of generating a decryption key with a tape drive, according to some examples.

FIG. 4 illustrates a flowchart for an example method 400 to generate a decryption key for a protected dataset. Although execution of method 400 is described below with reference to LTO tape drive 300 of FIG. 3, other suitable systems for execution of method 400 may be utilized (e.g., tape drive 100 or LTO tape drive 200). Additionally, implementation of method 400 is not limited to such examples, and method 400 may be used for any suitable device or system described herein or otherwise.

At 410 of method 400, LTO tape drive 300 receives pre-authorization code 382, creation timestamp 383, and initialization drive ID 384 from separate tape memory 380 of LTO tape cartridge 370. These items may come in the form of an electric signal that has been converted from the stored form by a reading mechanism of LTO tape drive 300

(not shown in FIG. 3). For example, separate tape memory 380 may be an RFID chip. Accordingly, pre-authorization code 382, creation timestamp 383, and initialization drive ID 384 may be sent to LTO tape drive 300 in a radio wave signal, read by an RFID reader in LTO tape drive 300, and converted to electrical signal by the RFID reader. Pre-authorization code 382 may be used by code engine 350 and creation timestamp 383 and initialization drive ID 384 may be used by key engine 330.

At 420 of method 400, code engine 350 may derive an authorization code using code derivation function 351, first shared secret 311, and pre-authorization code 382. In some examples, pre-authorization code 382 is a hash of an authentic authorization code. The first shared secret 311 and pre-authorization code 382 are inputted into code derivation function 351 to derive the authorization code.

At 430 of method 400, key engine 330 generates a decryption key for protected dataset 381 using key derivation function 331, the authorization code derived at 420, second shared secret 312, creation timestamp 383, and initialization drive ID 384. Second shared secret 312, creation timestamp 383, initialization drive ID 384, and the derived authorization code are inputted into key derivation function 331 to output a decryption key. In some examples, the decryption key that is generated may be a public key that is the public member of the private key used to encrypt protected dataset 381.

At 440 of method 400, decryption engine 360 decrypts protected dataset 381 using the decryption key generated at 440. Accordingly, the protected dataset 381 may be read by physical mechanisms in LTO tape drive 400, such as an RFID chip reader. The RFID chip reader converts the radio wave signals into electrical signals which are then sent to decryption engine 360. Decryption engine 360 may then use decryption key to decrypt protected dataset 381 into information usable to LTO tape drive 300.

Although the flowchart of FIG. 4 shows certain functionalities as occurring in one step, the functionalities of one step may be completed in at least one step (e.g., in multiple steps). Additionally, in some examples, functionalities described herein in relation to FIG. 4 may be provided in combination with functionalities described herein in relation to any of FIGS. 1-3, and 5-6.

Figure 5:
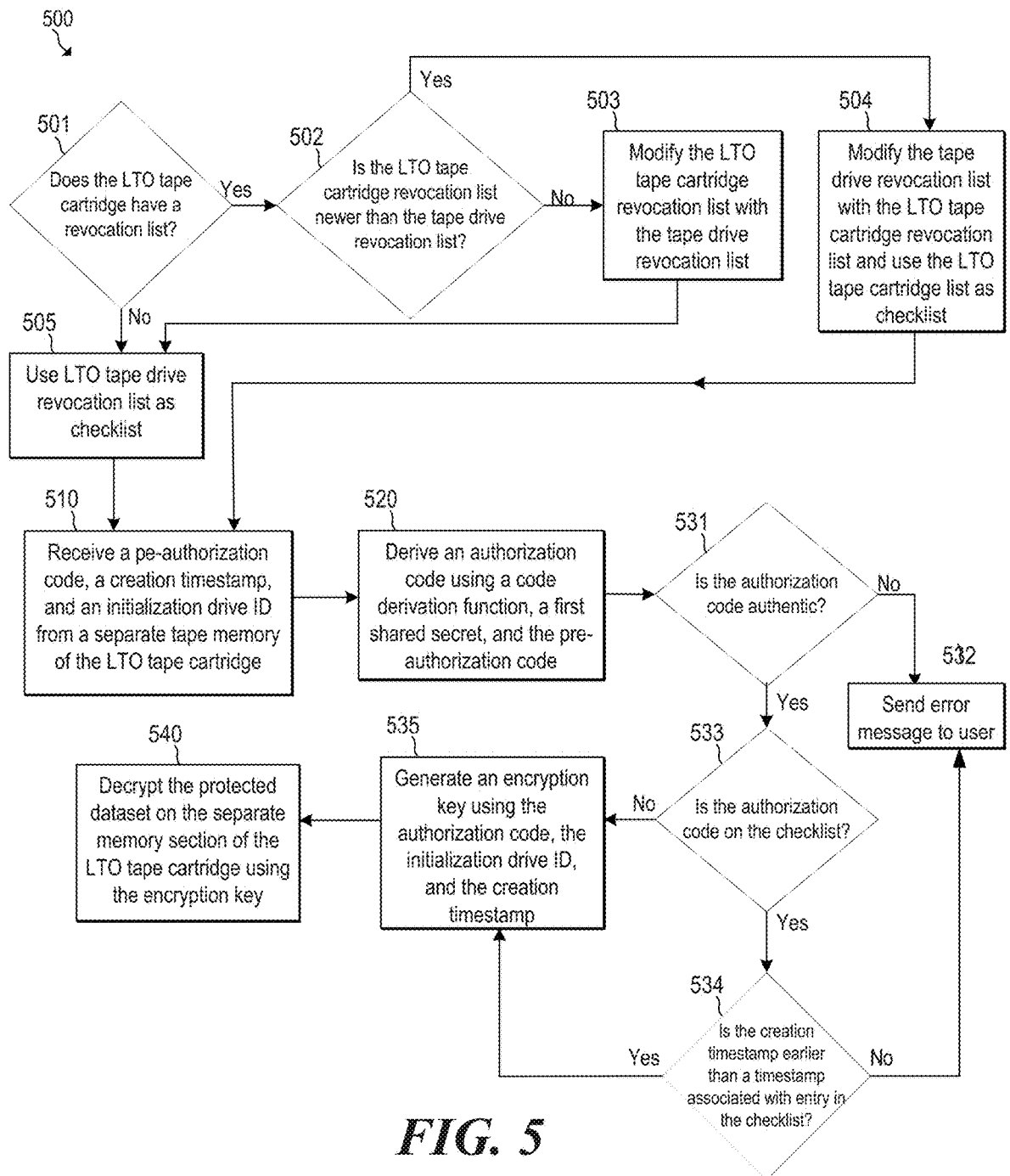
FIG. 5 is a flowchart of a method of determining validity of an authorization code stored on an LTO tape drive, according to some examples.

FIG. 5 illustrates a flowchart for an example method 500 to determine a validity of an authorization code. Although execution of method 500 is described below with reference to LTO tape drive 300 of FIG. 3, other suitable systems for execution of method 500 may be utilized (e.g., tape drive 100 or LTO tape drive 200). Additionally, implementation of method 500 is not limited to such examples, and method 500 may be used for any suitable device or system described herein or otherwise.

At 501 of method 500, revocation engine 350 may determine whether LTO tape cartridge 370 (that is inserted in LTO tape drive 300) has a revocation list stored in its separate tape memory 380. Based on a determination that LTO tape cartridge 370 has a revocation list 385 stored on separate tape memory 380, method moves to 502. At 502, revocation engine 350 determines whether revocation list 385 is newer than revocation list 313 stored on LTO tape drive 300. It may do so by comparing timestamps associated with both lists. Based on a determination that the revocation list 385 is newer than revocation list 313, method moves to 504. At 504, revocation engine 350 instructs LTO tape drive to modify revocation list 313 (on tape drive) with revocation list 385. Additionally, revocation engine 350 determines that revocation list 385 (the newer list) should be used as the revocation checklist for later steps in method 500. Method than proceeds to 510.

Referring back to step 502, based on a determination that revocation list 385 is older than revocation list 313, method moves to 503. At 503, revocation engine 350 instructs LTO tape drive to modify revocation list 385 (on tape cartridge) with revocation list 313. Method then proceeds to 505.

Referring back to step 501, based on a determination that LTO tape cartridge 370 does not have a revocation list, method moves to 505. At 505, revocation engine determines that LTO tape drive revocation list 313 should be used as the revocation checklist for later steps in method 500. Method then proceeds to 510.

510 is similar to 410 of method 400. 520 is similar to 420 of method 400. Accordingly, the discussion above in relation to those steps are also applicable here.

At 531 of method 500, key engine 330 determines whether the authorization code (derived at 520) is authentic. In some examples, key engine 330 may do this by confirming that the derived authentication code follows the mathematical rules of the algorithm. A derived authentication code that does not follow the rules is determined to be unauthentic. Based on a determination that the derived authentication code is unauthentic, method proceeds to 532. At 532, key engine 330 sends an error message to a user of LTO tape cartridge 370. This error message may be displayed on a display that is in communication with LTO tape drive 300. Based on a determination that the derived authentication code is authentic, method proceeds to 533.

At 533, revocation engine 350 determines a validity of derived authentication code. Revocation engine 350 may access the revocation checklist that it determined it should use earlier (in steps 504 or 505), and compares the authentication code to the codes listed on the revocation checklist. For example, revocation engine 350 may perform a query on the checklist to determine whether the authentication code is in the checklist. An authorization code that is not on the revocation checklist is determined to be valid. Based on a determination that the authorization code is valid, method 500 moves to 535.

However, an authorization code that is on the revocation checklist is determined to be possibly invalid. Based on a determination that the authentication code is on the checklist, method moves to 534. At 534, revocation engine determines whether the authorization code was invalidated before or after protected dataset 381 was written. Revocation engine may do this by comparing creation timestamp 383 to a timestamp associated with the entry on the revocation checklist (i.e. the revocation timestamp). Based on a determination that the creation timestamp indicates a later time than the revocation timestamp (i.e. the authorization code was already revoked at the time it was written), method moves to 532. At 532, revocation engine 350 sends an error message to a user of LTO tape cartridge 370. This error message may be displayed on a display that is in communication with LTO tape drive 300.

Referring back to 534, based on a determination that the creation timestamp indicates an earlier time than the revocation timestamp (i.e. the authorization code was not yet revoked at the time it was written), method moves to 535.

At 535, key engine 330 generates a decryption key for protected dataset 381 using key derivation function 331, the authorization code derived at 520, second shared secret 312, creation timestamp 383, and initialization drive ID 384. Second shared secret 312, creation timestamp 383, initialization drive ID 384, and the derived authorization code are inputted into key derivation function 331 to output a decryption key. In some examples, the decryption key that is generated may be the public member of the private key/public key pair chosen when protected dataset 381 was written (where protected dataset 381 was written using the private member of the pair). Method then proceeds to 540.

540 is similar to 440 of method 400. Accordingly, the discussion above in relation to 440 is also applicable here.

Although the flowchart of FIG. 5 shows certain functionalities as occurring in one step, the functionalities of one step may be completed in at least one step (e.g., in multiple steps). Additionally, in some examples, functionalities described herein in relation to FIG. 5 may be provided in combination with functionalities described herein in relation to any of FIGS. 1-5, and 6.

Figure 6:
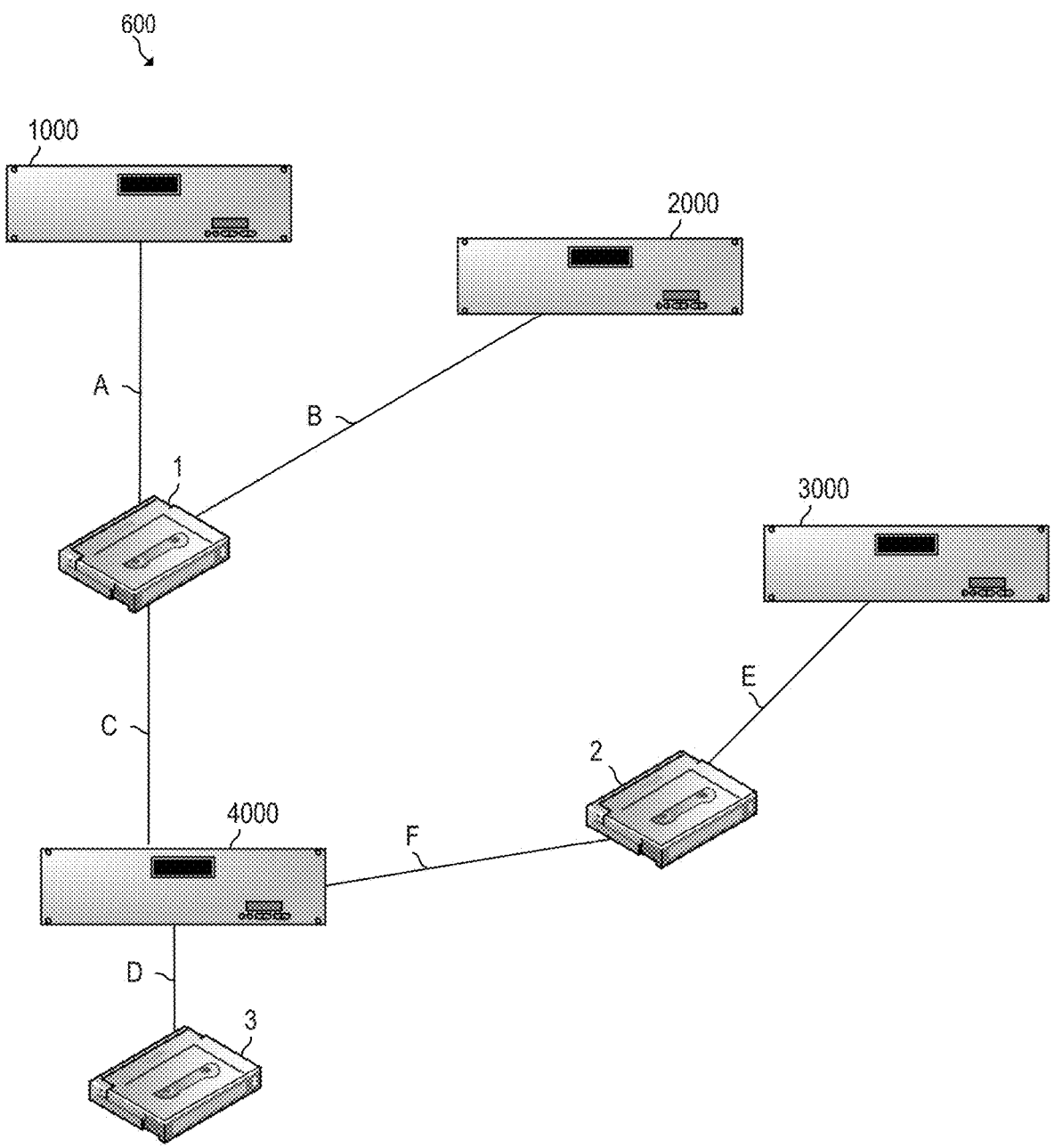
FIG. 6 is a representation of a tape system with multiple tape drives and tape cartridges, according to some examples.

FIG. 6 is a representation of interactions between tape drives 1000, 2000, 3000, and 4000 and tape cartridges 1, 2, and 3 in tape system 600. Tape drives 1000, 2000, 3000, and 4000 may include any of the components described in relation to tape drive 100, LTO tape drive 200, and/or LTO tape drive 300. Similarly, tape cartridges 1, 2, and 3 may include any of the components described in relation to tape cartridge 170, LTO tape cartridge 270, and/or LTO tape cartridge 370. In tape system 600, information from one tape drive may be disseminated throughout tape system 600 via tape cartridges.

For example, tape drives 1000, 2000, 3000, and 4000 may be located at different physical locations. Tape drive 1000 may initialize tape cartridge 1. Accordingly, tape drive 1000 may write into the tape memory of tape cartridge 1 a protected dataset, a creation timestamp, and an authorization code. Tape drive 1000 may also write to tape memory of cartridge 1 an initialization drive ID that is specifically identifies tape drive 1000 in tape system 600. This interaction between tape drive 1000 and tape cartridge 1 is represented by line A in FIG. 6. Tape drive 1000 may not write a revocation list to tape cartridge 1. For example, there may not be an existing revocation list that is available.

After tape cartridge 1 is initialized, tape cartridge 1 may be moved to the location where tape drive 2000 is located. A user of tape cartridge 1 may wish to read/write to tape cartridge 1 using tape drive 2000. Upon insertion of tape cartridge 1 into tape drive 2000, tape drive 2000 may access the authorization code, creation timestamp, and initialization drive ID on tape cartridge 1 to generate a decryption key for the protected dataset on tape cartridge 1. Tape drive 2000 may have stored on its drive memory a revocation list. Thus, tape drive 2000 may also write to the tape memory of tape cartridge 1 the revocation list that it has stored. This interaction between tape drive 2000 and tape cartridge 1 is represented by line B in FIG. 6.

Tape cartridge 1 may then be moved to a different location, where a user may have access to tape drive 4000. Upon insertion of tape cartridge 1 into tape drive 4000, tape drive 4000 may access the authorization code, creation timestamp, and initialization drive ID on tape cartridge 1 to generate a decryption key for the protected dataset on tape cartridge 1. Tape drive 4000 may have a revocation list stored. However, the revocation list stored on tape drive 4000 may be older than the revocation list now stored on tape cartridge 1. Accordingly, tape drive 4000 may modify its own revocation list with the revocation list of tape cartridge 1. This interaction between tape drive 2000 and tape cartridge 1 is represented by line C in FIG. 6.

Tape cartridge 3 may then be inserted into tape drive 4000. Tape cartridge 3 may be newly manufactured. Thus, tape drive 4000 may initialize tape cartridge 3. Accordingly, tape drive 4000 may write into the tape memory of tape cartridge 3 a protected dataset, a creation timestamp, an authorization code, and an initialization drive ID that specifically identifies tape drive 4000. Additionally, tape drive 4000 may write to tape cartridge 3 the revocation list that tape drive 4000 received from tape cartridge 1. This interaction between tape drive 4000 and tape cartridge 3 is represented by line D in FIG. 6

Tape cartridge 2 may then be inserted into tape drive 3000. Tape cartridge 2 may be newly manufactured. Thus, tape drive 3000 may initialize tape cartridge 2. Accordingly, tape drive 3000 may write into the tape memory of tape cartridge 2 a protected dataset, a creation timestamp, an authorization code, and an initialization drive ID that specifically identifies tape drive 3000. Tape drive 3000 may have a revocation list and accordingly write that revocation list to tape cartridge 2. This interaction between tape drive 3000 and tape cartridge 2 is represented by line E in FIG. 6

Tape cartridge 2 may be moved to the physical location of tape drive 4000. Upon insertion of tape cartridge 2 into tape drive 4000, tape drive 4000 may access the authorization code, creation timestamp, and initialization drive ID on tape cartridge 2 to generate a decryption key for the protected dataset on tape cartridge 2. Tape drive 4000 may also compare the revocation list stored on tape cartridge 2 (received from tape drive 3000) to the revocation list that it has stored (received from tape cartridge 1). Tape drive 4000 may determine that one is newer than the other. Accordingly, it may modify the older revocation list with the newer revocation list. Thus, it may modify the revocation list it has stored (received from tape cartridge 1) based on a determination that the revocation list on tape cartridge 2 is newer. Additionally, it may modify the revocation list on tape cartridge 2 (received from tape drive 3000) based on a determination that the revocation list it has stored is newer.

Accordingly, new information (e.g., revocation lists) originating from one location in tape system 600 may be disseminated and replace older information at different locations due to the movement of the tape cartridges throughout the tape system 600 This may be helpful in tape systems that are not connected to each other via a communication network or in situations when there the communication network is not working properly.

All of the features disclosed in this specification (including any accompanying claims, abstract and drawings), and/or all of the elements of any method or process so disclosed, may be combined in any combination, except combinations where at least some of such features and/or elements are mutually exclusive.

What is claimed is:

1. A linear-tape open (LTO) tape drive comprising:
    a drive memory to store a first shared secret and a second shared secret;
    an opening to receive an LTO tape cartridge, wherein the LTO tape cartridge stores a protected dataset, a pre-authorization code, a creation timestamp, and an initialization ID;
    a hardware processor to derive an authorization code using a code derivation function, the first shared secret, and the pre-authorization code, wherein the pre-authorization code is read by the LTO tape drive from the LTO tape cartridge;
    a key engine to generate a decryption key for the protected dataset based on the authorization code, the creation timestamp, the initialization ID, and the second shared secret; and the hardware processor further to decrypt the protected dataset using the decryption key, wherein the protected dataset comprises cartridge configuration information.

2. The LTO tape drive of claim 1,
wherein the drive memory is to store a revocation list; and
wherein the LTO tape drive comprises a revocation engine to determine a validity of the authorization code based on the revocation list.

3. The LTO tape drive of claim 2,
wherein the revocation list comprises an entry associated with a revocation timestamp; and
wherein the revocation engine is to determine the validity of the authorization code based on the revocation timestamp and the creation timestamp.

4. A linear-tape open (LTO) tape drive comprising:
a drive memory to store a first shared secret and a second shared secret;
an opening to receive an LTO tape cartridge, wherein the LTO tape cartridge comprises tape media and a tape memory separate from the tape media, the separate tape memory storing a protected dataset, a pre-authorization code, a creation timestamp, and an initialization drive ID;
a hardware processor to derive an authorization code using a code derivation function, the first shared secret, and the pre-authorization code, wherein the pre-authorization code is read by the LTO tape drive from separate tape memory of the LTO tape cartridge;
a key engine to generate a decryption key for the protected dataset by inputting the authorization code, the second shared secret, the creation timestamp, and the initialization drive ID into a key derivation function, wherein the initialization drive ID is read from the separate tape memory; and
the hardware processor further to decrypt the protected dataset from the separate tape memory using the decryption key, wherein the protected dataset comprises cartridge configuration information.

5. The LTO tape drive of claim 4,
wherein the drive memory is to store a revocation list; and
wherein the LTO tape drive comprises a revocation engine to determine a validity of the authorization code based on the revocation list.

6. The LTO tape drive of claim 5,
wherein the revocation list comprises an entry associated with a revocation timestamp; and
wherein the revocation engine is to determine the validity of the authorization code based on a comparison of the revocation timestamp and the creation timestamp.

7. The LTO tape drive of claim 4,
wherein the drive memory is to store a first revocation list associated with a first list timestamp;
wherein the separate tape memory stores a second revocation list associated with a second list timestamp; and
wherein the LTO tape drive comprises a revocation engine to determine an expiration of the first revocation based on the first list timestamp and the second list timestamp.

8. The LTO tape drive of claim 7,
wherein the revocation engine is to, in response to a determination that one revocation list out of the first revocation list and the second revocation list is expired and the other revocation list out of the first revocation list and the second revocation list is not expired, modify the expired revocation list with the un-expired revocation list.

9. A method comprising:
receiving, at a processor of a linear-tape open (LTO) tape drive, a pre-authorization code, a creation timestamp, and an initialization drive ID from a separate tape memory of an LTO tape cartridge;
deriving, with the processor, an authorization code using a code derivation function, a first shared secret stored on the LTO tape drive, and the pre-authorization code read from the separate tape memory;
generating, with the processor, a decryption key using a key derivation function, a second shared secret stored on the LTO drive, the authorization code, the creation timestamp, and the initialization drive ID; and
decrypting, with the processor, a protected dataset from the separate tape memory using the decryption key, wherein the protected data comprises cartridge configuration information.

10. The method of claim 9, comprising determining, with the processor, a validity of the authorization code based on a revocation list.

11. The method of claim 9, wherein the revocation list is stored on the LTO tape drive.

12. The method of claim 9, wherein the revocation list is stored on the LTO tape cartridge.

13. The method of claim 9, comprising:
receiving, at the processor, a first revocation list from the LTO tape cartridge;
comparing, with the processor, a timestamp associated with the first revocation list to a timestamp associated with a second revocation list on the LTO tape drive; and
in response to a determination that the first revocation list is older than the second revocation list, modifying, with the LTO tape drive, the first revocation list with the second revocation list.

14. The method of claim 9, comprising:
receiving, at the processor, a first revocation list from the LTO tape cartridge;
comparing, with the processor, a timestamp associated with the first revocation list to a timestamp associated with a second revocation list on the LTO tape drive; and
in response to a determination that the second revocation list is older than the first revocation list, modifying, with the LTO tape drive, the second revocation list with the first revocation list.

\* \* \* \* \*